United States Patent [19]
Adler et al.

[11] 3,723,915
[45] Mar. 27, 1973

[54] ACOUSTIC SURFACE WAVE DEVICE

[75] Inventors: Robert Adler, Northfield; Adrian J. DeVries, Elmhurst, both of Ill.; Fleming Dias, Palo Alto, Calif.

[73] Assignee: Zenith Radio Corporation, Chicago, Ill.

[22] Filed: May 10, 1971

[21] Appl. No.: 141,911

Related U.S. Application Data

[62] Division of Ser. No. 817,093, April 17, 1969, Pat. No. 3,582,540.

[52] U.S. Cl..................................333/30 R, 333/72
[51] Int. Cl..........H03h 7/36, H03h 9/00, H03h 9/30
[58] Field of Search.....333/30, 6, 72; 330/5.5; 343/8

[56] References Cited

UNITED STATES PATENTS

| | | | |
|---|---|---|---|
| 3,406,358 | 10/1968 | Seidel et al. | 333/30 R |
| 3,566,310 | 2/1971 | Fidi et al. | 333/30 R |
| 3,377,588 | 4/1968 | Picquendar | 343/8 |
| 3,568,102 | 7/1967 | Tseng | 333/30 |
| 3,388,334 | 6/1968 | Adler | 330/5.5 |
| 3,283,264 | 11/1966 | Papadakis | 333/6 |

*Primary Examiner*—Herman Karl Saalbach
*Assistant Examiner*—Marvin Nussbaum
*Attorney*—Francis W. Crotty and Cornelius J. O'Connor

[57] ABSTRACT

A variable transmission apparatus for translating signals between a source and a load comprises a substrate propagative of acoustic surface waves. An input transducer coupled to a surface of the substrate and responsive to applied signals serves to launch acoustic waves. An output transducer is coupled to a portion of the surface spaced from the input transducer and, in response to the launched waves, derives output signals having a delay, relative to the input signals, that corresponds to the spacing between the transducers. Means are included for flexing the substrate to alter the surface wave phase velocity.

1 Claim, 5 Drawing Figures

ACOUSTIC SURFACE WAVE DEVICE

CO-REFERENCE TO RELATED APPLICATIONS

The present application is a division of application Ser. No. 817,093 filed Apr. 17, 1969 now U.S. Pat. No. 3,582,540 and assigned to the same assignee as the present invention.

The present application is a further development of the subject matter disclosed and claimed in the following applications all of which are assigned to the assignee of this invention: Ser. No. 789,839 filed Jan. 8, 1969 in the name of Adrian J. DeVries et al now U.S. Pat. No. 3,573,673; Ser. No. 721,038 filed Apr. 12, 1968 in the name of Adrian J. DeVries now U.S. Pat. No. 3,582,838; and Ser. No. 752,073 filed Aug. 12, 1968 in the name of Robert Adler et al now U.S. Pat. No. 3,600,710.

BACKGROUND OF THE INVENTION

The invention pertains to color television receivers. More particularly, it relates to the inclusion in such receivers of surface wave integratable filters (SWIFS) as signal transmission elements that enable construction of much of the receiver entirely of solid-state components.

A variety of circuit arrangements are known for processing a received composite television program signal in order to reproduce a polychrome image and its associated sound. These different arrangements have in common stages or channels that impose certain selectivity characteristics in order to act differently on different parts of the received composite signal, that is to say, to split or divide different portions of that signal among different channels, to delay the transmission of the signal component in any one channel relative to another and to act upon the different signal components in a manner determined by their frequency or changes in frequency. Heretofore, many of the signal processing operations have required the use of inductive elements. Typically, these are coils formed by physically winding a length of wire about a core or coil form, yielding a device that often is of significant physical size and which, during manufacture of the receiver, must be fabricated, handled, mounted and adjusted as a separate, discrete component.

Until recently, all television receivers were a combination of a very large number of discrete components such as electron tubes, resistors, condensors and, as mentioned, wire-wound inductors. However, the introduction of the transistor and other solid-state active devices initiated a reduction in component sizes, and the subsequent development of integrated solid-state circuitry has led to at least the anticipation of complete monochrome and color television receivers wherein the entire apparatus, except for the image reproducer, the audio speaker and possibly the radio-frequency tuner, is fabricated of solid-state integrated circuitry. This anticipation has been nurtured because of the capability developed in the art of so integrating a number of different circuits each including a variety of active devices, such as transistors, together with interconnecting resistors and capacitors. However, progress toward the ultimate end of a completely integrated receiver has, until recently, been thwarted because of the infeasibility of providing a solid-state equivalent of the inductance necessary to the different signal paths in order to impart such desired characteristics as controlled selectivity and phase shift.

A different approach to obtaining selectivity of a controlled character in the signal transmission channels of color television receivers and other systems that is amenable to solid-state circuitry is the subject of the copending application of Adrian DeVries, Ser. No. 721,038, filed Apr. 12, 1968 now U.S. Pat. No. 3,582,838, which discloses and claims a variety of acoustic-wave devices in which transducers interact with acoustic surface waves propagated on a substrate. By appropriate selection of the propagating material an design of the transducers, a wide variety of different selectivity characteristics may be obtained. Such devices are useful, for example, in the intermediate-frequency channels of television receivers and in discriminators for demodulating frequency-modulated intelligence such as the audio signal which is part of a composite television program signal. These acoustic wave devices may be fabricated entirely with integrated-circuit techniques and their overall sizes at television frequencies involve dimensions of but fractions of an inch. They lend themselves admirably to combination with other active and passive elements as portions of completely integrated solid-state systems. Because of their nature, such devices have been denoted as surface wave integratable filters and, for convenience, have come to be known by the abbreviation SWIFS.

It is the general object of the present invention to provide a new and improved SWIF device useful for processing signals such as those translated in color television receivers.

It is a specific object of the present invention to provide a new and improved SWIF device for use as a variable transmission apparatus in a color television receiver.

A further object of the present invention is to provide a SWIF device of the foregoing character that is capable of being fabricated by and is fully compatible with conventional techniques employed in the manufacture of integrated solid-state circuits.

SUMMARY OF THE INVENTION

A device constructed in accordance with the present invention generally takes the form of apparatus that is to be interposed between a source and a load. Basic to the device is an acoustic-surface-wave propagating medium in the form of a substrate. Input and output transducers are coupled to spaced portions of the substrate to effect transmission of wave signals therebetween. Means are provided for flexing the substrate in order to alter the surface-wave phase velocity.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENTS

Figure 1:
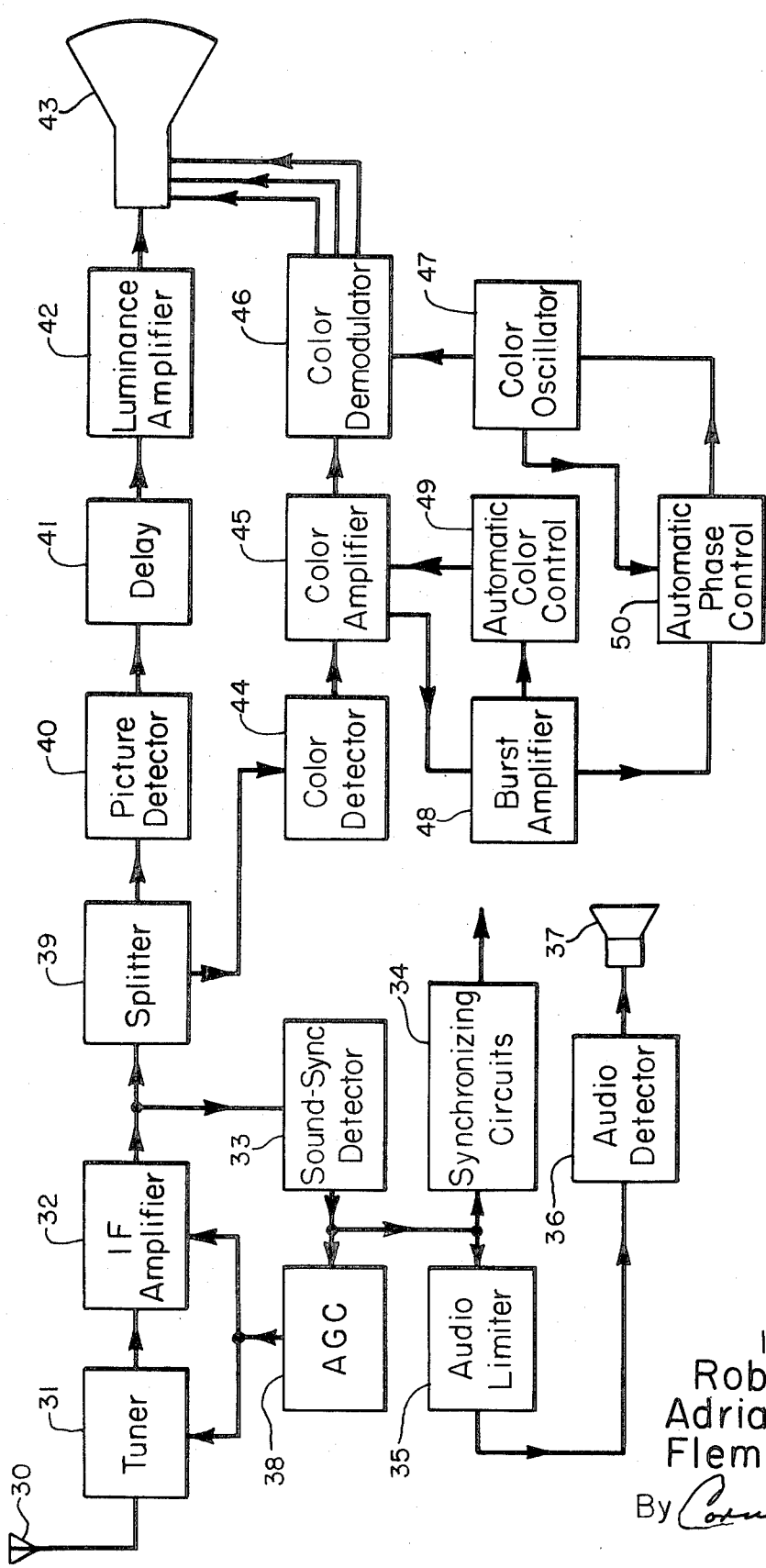
FIG. 1 is a block diagram of a color television receiver in which embodiments of the invention are utilized.

FIG. 1 illustrates a color television receiver having but one of many different signal processing approaches which, in the overall, may be utilized in taking advantage of improvements made available with the present invention. Radio-frequency color program signals received by an antenna 30 are fed to a tuner 31 that selects a desired program signal and converts it to an intermediate-frequency signal which, in turn, is fed to an intermediate-frequency amplifier 32. The frequency response of amplifier 32 is carefully tailored to amplify or attenuate different portions of the composite signal in a manner to be discussed further in connection with FIG. 2. One portion of the signal delivered by amplifier 32 is fed to a detector 33 that selects from the intermediate-frequency signal and demodulates both the synchronizing signals and the audio program signal. Being separable by virtue of their individually different frequency characteristics, these two signals are respectively fed to synchronizing circuits 34 and an audio system composed of a limiter 35, a detector and amplifier 36 and a loud speaker 37. The horizontal-deflection synchronizing signal pulses also are fed to an automatic gain control system 38 in which the level of those pulses is utilized to develop a gain-control potential that is fed back to tuner 31 and to intermediate-frequency amplifier 32 in a manner to control their gain such that the developed intermediate-frequency signal is of constant amplitude; as now well understood, this arrangement preferably includes means for gating or turning on the AGC system only during the existence of the horizontal sync pulses. From a systems' standpoint, as well as with respect to details of circuitry that may be used particularly in the synchronizing circuitry, the operations of the synchronizing, automatic-gain control and audio portions of the receiver are well understood and conventional in the art. Accordingly, they need not be further discussed herein except with respect to certain specific improvements to be described later.

Another portion of the intermediate-frequency output signal from amplifier 32 is fed to a signal splitter 39 that separates certain portions of the composite signal on the basis of frequency; in practice, splitter 39 may be immediately preceded by an additional intermediate-frequency stage for further attenuation of the audio program signal, or, alternatively, this selectively function may be included in splitter 39 itself. One output signal from splitter 39 is applied to a luminance channel composed of a picture detector 40, a delay element 41 and a luminance amplifier 42. Detector 40 develops from the incoming composite signal a luminance or video signal that is representative of the brightness of the image to be reproduced. For reasons to be described later, that signal is delayed in time by delay element 41 and then strengthened by amplifier 42 before it is applied to one input electrode of each electron gun of an image reproducer 43 which in present-day usage is in the form of a three-gun cathode-ray tube. The video signal is used in this instance to intensity modulate the three electron beams of the color picture tube. Of course, the electron beams are simultaneously caused to be deflected both horizontally and vertically to define an image raster, under the timing control of the synchronizing circuitry.

Another portion of the composite intermediate-frequency signal fed to splitter 39 is directed into a chroma channel basically composed of a color detector 44, a color amplifier 45 and a color demodulator 46. Detector 44 yields a chroma signal that is amplified by amplifier 45 and supplied to demodulator 46 which also receives a reference signal from a color oscillator 47. Demodulator 46 develops three color-control signals, generally representative of red, green and blue in the ultimate image, that are supplied to additional control electrodes of assigned ones of the three electron guns in image-reproducer 43 so as further to control the intensity individually of the three different beams and, hence, the ultimate hue and saturation of the reproduced image. Typically, the color-control signals are so-called color-difference signals that represent, with respect to each color, the difference between the instantaneous value of the luminance signal and the corresponding primary color value of the image point being displayed; by appropriate combination or internal matrixing of these various signals applied to the respective electron beams, essentially true primary colors are developed.

In traversing the chroma channel, the color information signal experiences a time delay and the function of delay element 41 is to similarly delay the luminance signal to the end that, when recombined within image reproducer 43, the luminance and chrominance signals are properly correlated. As will be described further, the function of delay element 41 may be achieved within signal splitter 39 in which case element 41 would not be required as a separate stage. On the other hand, other well-known receiver signal processing systems utilize a common detector for the luminance and chroma signals and in those cases, splitter 39 may be omitted or, in a further alternative, it may be used instead to separate out the audio and synchronizing signals while tailoring the frequency response presented to the composite signal portion fed on to the video detector.

Also associated with the chroma channel and reference oscillator 47 are a burst amplifier 48, an automatic-color-control system 49 and an automatic phase control 50. Amplifier 48 selects from the color signal applied thereto the color burst signal which conventionally is transmitted as a part of the composite program signal to enable synchronized operation of color demodulator 46. To that end, the amplifier is gated or otherwise controlled to supply the color burst signal to an automatic phase control system 50 which also receives a sample of the reference signal developed by oscillator 47. Control system 50 compares the phase of its two input signals to develop a control signal that is fed back to reference oscillator 47 to maintain the phase of its output signal, fed to demodulator 46, precisely at the requisite value. A portion of the color burst signal is also fed from amplifier 48 to an automatic color control system 49 which develops a control signal that is representative of the burst signal amplitude and is fed back to color amplifier 45 to control its gain in a manner to maintain constant the strength of the color signal fed to demodulator 46.

The functions and manner of overall operation of each of the luminance and chroma channels are well understood and basically conventional in the art. It is, therefore, unnecessary to describe them further. Similarly, the receiver is understood to include such conventional additional circuits and components as those which enable the control tone and volume of the audio signal, contrast and brightness of the image, hue and saturation of the color and a circuit to kill the operation of the chroma channel when the received composite program signal includes only monochrome picture information.

Typically, the receiver also includes a plurality of different traps located at various places in its signal paths in order to preclude transmittal of undesired signal components. Proper operation of the color television receiver demands that each of the several signal paths thereof exhibit accurately determined selectivity to emphasize and pass those signal components desired in that path and attenuate or reject other signal components that may in any way interfere with the desired components. While the signal-transmission characteristics required in the different paths or channels are now well-known, making it unnecessary to discuss the different characteristics of all of the various different paths, it is appropriate to examine the overall characteristic desired for the intermediate-frequency amplifier, including amplifier 32 and the previously-mentioned additional stage that may precede or be included in splitter 39.

Figure 2:
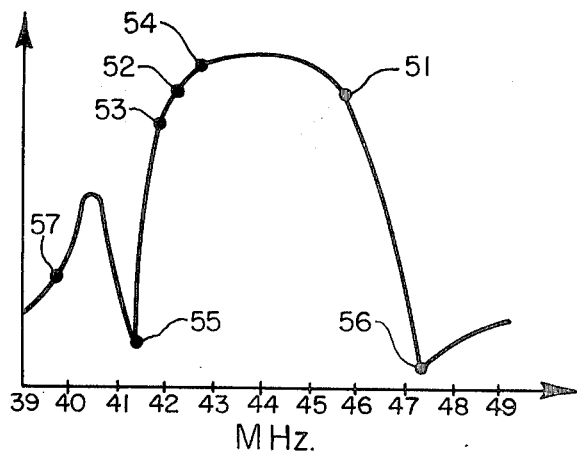
FIG. 2 is a diagram illustrating an intermediate-frequency response desired in the receiver of FIG. 1.

FIG. 2 depicts such a selectivity characteristic or response curve in terms of signal amplitude as a function of frequency. As indicated, the intermediate-frequency channel exhibits a broad bandwidth of transmission for the desired composite program signal between about 41.5 and 46 megahertz. More specifically, the selected composite program signal IF carrier is indicated by marker 51 located at 45.75 megahertz, while the chroma subcarrier thereof, indicated by marker 52, is located at 42.17 megahertz. The upper and lower ends of what may be termed the chroma signal passband are indicated respectively by markers 53 and 54 at 41.75 and 42.77 megahertz. So as not to interfere with the image information, the associated sound carrier is located at 41.25 megahertz as indicated by marker 55 and the sound carrier of the adjacent composite-signal channel is even more greatly attenuated as shown by marker 56 located at 47.25 megahertz. To complete the overall representation, the adjacent program signal channel on the other side has its primary picture carrier located at 39.75 megahertz as depicted by marker 57. It will thus be seen that the overall frequency response of the intermediate-frequency channel is characterized by the presentation of what basically is a broad bandwidth over approximately 4.5 megahertz while being substantially reduced at those frequencies corresponding to the adjacent picture and sound carriers as well as the associated sound carrier. Such reduced response at those points typically has been obtained by the inclusion of additional trap circuits tuned to each of those different frequencies.

As indicated above, application Ser. No. 721,038 discloses in detail an approach that employs a combination of SWIFS in the intermediate-frequency channel of a color television receiver to achieve a selectivity characteristic of the kind shown in FIG. 2. In one example, the individual selectivity characteristics of three different SWIFS in series in the intermediate-frequency channel are combined to give the overall desired characteristic. The use of the SWIFS, instead of such typical frequency-determining elements as coils, enables construction of the entire intermediate-frequency amplifier as a single integrated circuit extremely small in size.

Figure 3:
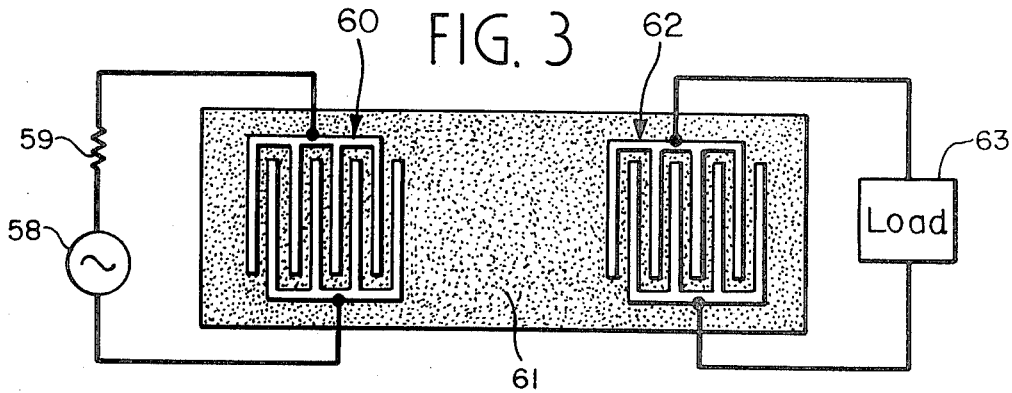
FIG. 3 is a schematic diagram of a SWIF system.

For the purpose of explaining in more detail the basic nature and principles of operation of a SWIF in general, FIG. 3 illustrates one form of a very simple SWIF that also is disclosed and described in the aforementioned copending application. A signal source 58 in series with a resistor 59, which may represent the internal impedance of that source, is connected across an input transducer 60 mechanically coupled to one major surface of a body of piezoelectric material shown on a substrate 61 and which serves as an acoustic-surface-wave propagating medium. An output or second portion of the same surface of substrate 61 is, in turn, mechanically coupled to an output transducer 62 across which a load 63 is coupled.

Transducers 60 and 62 in this simplest arrangement are identical and are individually constructed of two comb-type electrode arrays. The stripes or conductive elements of one comb are interleaved with the stripes of the other. The electrodes are of a material, such as gold or aluminum, which may be vacuum deposited or photoetched on a smoothly-lapped and polished planar surface of the piezoelectric body. The piezoelectric material is one, such as PZT, Zinc Oxide, Lithium Niobate or quartz, that is propagative of acoustic surface waves. The distance between the centers of two consecutive stripes in each array is one-half of the acoustic wavelength of the signal wave for which it is desired to achieve maximum response.

Direct piezoelectric surface-wave transduction is accomplished by the spatially periodic interdigital electrodes or teeth of transducer 60. A periodic electric field is produced when a signal from source 58 is fed to the electrodes and, through piezoelectric coupling, the electric signal is transduced to a traveling acoustic wave on substrate 61. This occurs when the stress components produced by the electric fields in the piezoelectric substrate are substantially matched to the stress components associated with the surface-wave mode. Source 58, for example, a portion of the television receiver in FIG. 1, produces a range of signal frequencies, but due to the selective nature of the arrangement only a particular frequency and its intelligence carrying sidebands are converted to a utilized surface wave. More specifically, source 58 may be tuner 31 which selects the desired program signal for application to load 63 which in this environment includes one or more of those signal channels beginning with detectors 33, 40 and 44. The surface waves resulting in substrate 61, are transmitted along the substrate to output transducers 62 where they are converted to an electrical signal for application to load 63. The signal will suffer attenuation in traversing the SWIF under consideration which will be compensated and the other IF gain requirement satisfied by IF amplification, preferably of the solid state type e.g. transistors associated with or formed as part of the SWIF.

In a typical television IF embodiment, utilizing PZT as the piezoelectric substrate, the stripes of both transducer 60 and transducer 62 are approximately 0.5 mil wide and are separated by 0.5 mil for the application of an IF signal in the typical range of 40–46 megahertz. The spacing between transducer 60 and transducer 62 is on the order of 60 mils and the width of the wavefront is of approximately 0.1 inch. This structure of transducers 60 and 62 and substrate 61 can be compared to a cascade of two tuned circuits with a resonant frequency of approximately 40 megahertz, the resonant frequency being determined, at least to a first order, by the spacing of the stripes of the transducers.

The potential developed between any given pair of successive stripes in electrode array 60 produces two waves traveling along the surface of substrate 61 in opposing directions perpendicular to the stripes for the illustrative isotropic case of a ceramic poled perpendicularly to the surface. When the center-to-center distance between the stripes is one-half of the acoustic wavelength of the wave at the desired input frequency, or is an odd multiple thereof, relative maxima of the output waves are produced by piezoelectric transduction in transducer 62. For increased selectivity, additional electrode stripes are added to the comb patterns of transducers 60 and 62. Further modifications and adjustments are described in the aforementioned copending application for the purpose of particularly shaping the response presented by the filter to the transmitted signal.

Optimum performance of the SWIF discussed herein, as well as those described in parent application Ser. No. 817,093, requires that the electrode pattern be deposited with precision in order to obtain the desired interelectrode spacings and frequency response. In a stage wherein phase delay of a particular amount is a design factor, the spacings between the different transducers as well as the physical characteristics of the wave-propagating surface may require care and accuracy of fabrication. In addition, certain stages of the receiver desirably may include, either by reason of their mode of operation or to permit compensation for variation in external parameters, adjustability of frequency response or phase delay; for example, in order to compensate for possible variations elsewhere in the chroma channel, it may be desirable to provide adjustability of the exact point, in terms of phase, at which the color oscillator is locked for a given automatic-phase-control potential, as in the case of the SWIF system of FIG. 13 in the parent application. Of course, adjustability of the hue of the reproduced polychrome image also requires the introduction of a controllable phase variation in the chroma channel. For these and other uses, the embodiments of FIGS. 4 and 5 permit a degree of flexibility or compensation.

Figure 4:
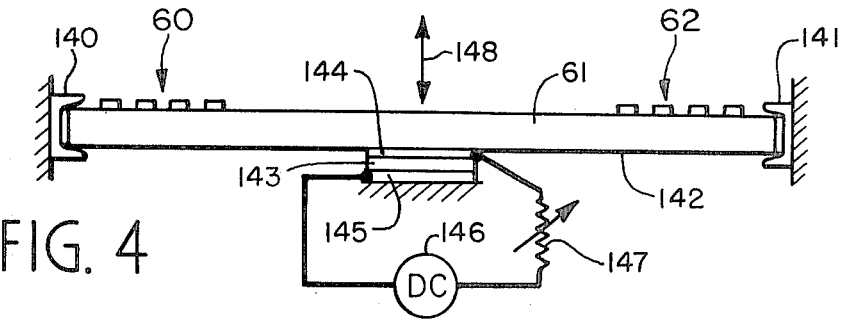
FIGS. 4 and 5 are partially-schematic front elevational views of tunable or adjustable SWIFS.

In FIG. 4, substrate 61 is secured at its opposite ends in rigid supports 140 and 141. Affixed against one major surface 142, opposite its wave-propagating surface 61 and positioned between transducers 60 and 62, is an electromechanical transducer composed of a piezoelectric body 143 sandwiched between a pair of conductive electrodes 144 and 145. Electrode 145 is affixed to a rigid external structure. A direct-current signal source 146 is coupled across electrodes 144 and 145. Piezoelectric body 143 is so oriented that, upon the application of a signal from source 146, it changes its physical dimension in a direction transverse to the plane of surface 142. An adjustable resistor 147, in series with source 146 and electrodes 144–145, permits adjustment of the amplitude of the signal applied across the transducer. Alternatively, the transducers 60 and 62 may be disposed on one surface of a bimorph bender, examples of which are well known in the phonograph field.

In operation, variation of the signal level applied between electrodes 144 and 145 causes substrate 61 to be laterally flexed as indicated by arrow 148. That variation causes a change in the elastic constants of the wave-propagating surface. In turn, the surface-wave phase velocity is altered.

Although the precise nature of this phenomenon is not yet fully understood, it has been discovered that such flexing of the substrate can yield a change of surface-wave phase velocity of the order of at least one-half percent, a significant value. Hence, control of the level of the signal from source 146 permits adjustment of the delay between transducers 60 and 62.

In similar fashion, controlled variation or tuning of the selectivity characteristics of a SWIF may be accomplished by controlled lateral flexing or displacement.

Figure 5:
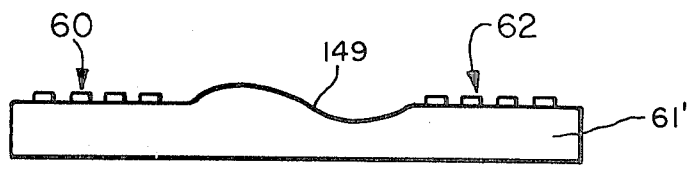

FIG. 5 illustrates another approach to the adjustment of the signal delay time between transducers 60 and 62. In this case, the substrate, now designated 61' to indicate a changed condition, is modified to include a corrugation 149 disposed in its wave propagating surface across the path of the acoustic waves. The height and depth of the corrugation, and hence the distance of wave travel across the corrugated surface, effects and determines the amount of an increase or decrease in the total length of surface-wave travel between transducer 60 and 62. That is, a deepening of the groove in the corrugation effects an increase in the delay time of signal transmission between the input and output transducers. Conversely, a removal of a portion of the hump causes a decrease in delay time. One or the other of these modifications may be used, for example, to compensate for inaccuracy in the original fabrication of the SWIF or to compensate for possible subsequent variation in the surface-wave velocity.

While particular embodiments of the invention have been shown and described, modifications may be made, and it is intended in the appended claims to cover all such modifications as may fall within the true spirit and scope of the invention.

We claim:

1. In a wave signal apparatus for translating signals between a source and a load, variable transmission apparatus comprising:
   a substrate propagative of acoustic surface waves;
   an input transducer coupled to a surface of said substrate and responsive to applied signals for launching acoustic surface waves on said surface;
   means for applying signals to said input transducer;

an output transducer coupled to a portion of said surface spaced from said input transducer and responsive to said waves for deriving, for application to a load, output signals having a delay relative to said input signals corresponding to the spacing between said transducers;

and means for flexing said substrate to alter the surface-wave phase velocity, thereof.

* * * * *